United States Patent
Huang

(10) Patent No.: US 9,288,296 B2
(45) Date of Patent: Mar. 15, 2016

(54) MOBILE PHONE AND METHOD FOR OUTPUTTING KERNEL MESSAGE

(71) Applicant: Wistron Corporation, New Taipei (TW)

(72) Inventor: Wen-Cheng Huang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 113 days.

(21) Appl. No.: 14/446,375

(22) Filed: Jul. 30, 2014

(65) Prior Publication Data

US 2015/0201059 A1 Jul. 16, 2015

(30) Foreign Application Priority Data

Jan. 14, 2014 (TW) ................. 103101317 A

(51) Int. Cl.
*H04B 1/38* (2015.01)
*H04M 1/24* (2006.01)
(52) U.S. Cl.
CPC ....................................... *H04M 1/24* (2013.01)
(58) Field of Classification Search
CPC ............. G01R 31/3658; G01R 31/362; G01R 31/3624; G01R 31/041; G01R 31/14; G01R 31/31926; G01R 31/327; G01R 31/3648; G01R 35/00; G01R 31/021; G01R 31/1272; G01R 31/2829; G01R 33/0017; G01R 33/0035
USPC .............................................. 455/550.1–90.3
See application file for complete search history.

(56) References Cited

U.S. PATENT DOCUMENTS

2013/0266289 A1* 10/2013 Oyman ................. H04N 13/00
386/248

FOREIGN PATENT DOCUMENTS

EP 1870810 A2 12/2007
TW 201351974 A 12/2013

OTHER PUBLICATIONS

TW Office Action dated Jun. 29, 2015 in corresponding TW application (No. 103101317).

\* cited by examiner

*Primary Examiner* — Ronald Eisner
(74) *Attorney, Agent, or Firm* — McClure, Qualey & Rodack, LLP

(57) ABSTRACT

A mobile phone and a method for outputting a kernel debugging message are provided. The mobile phone comprises an audio jack, a level converter, an audio chip, a multiplexer and a central process unit (CPU). The level converter converts a voltage level of the first kernel debugging message to output a second kernel debugging message. The multiplexer comprises an output port, a first input port and a second input port. The output port is connected to the audio jack. The first input port is connected to the level converter. The second input port is connected to the audio chip. After receiving a debugging message output command, the CPU controls the output port to be electrically connected to the first input port to output the second kernel debugging message to the audio jack according to the debugging message output command.

12 Claims, 2 Drawing Sheets

MOBILE PHONE AND METHOD FOR OUTPUTTING KERNEL MESSAGE

This application claims the benefit of Taiwan application Serial No. 103101317, filed Jan. 14, 2014, the subject matter of which is incorporated herein by reference.

BACKGROUND OF THE INVENTION

1. Field of the Invention

The invention relates in general to an electronic device, and more particularly to a mobile phone and a method for outputting a kernel debugging message.

2. Description of the Related Art

Along with the development in mobile phone technologies, the mobile phone is directed towards diversified functions. The more functions a mobile phone has, the more items need to be tested by the mobile phone. Particularly, it is very important for the production personnel to obtain a debugging message from the kernel space. At the time when the assembly of mobile phone is completed, the serial console might have been removed, making the operator unable to obtain the debugging message from the kernel space.

SUMMARY OF THE INVENTION

The invention is directed to a mobile phone and a method for outputting a kernel debugging message.

According to one embodiment of the present invention, a mobile phone is provided. The mobile phone comprises an audio jack, a level converter, an audio chip, a multiplexer and a central process unit (CPU). The level converter converts a voltage level of the first kernel debugging message to output a second kernel debugging message. The multiplexer comprises an output port, a first input port and a second input port. The output port is connected to the audio jack. The first input port is connected to the level converter. The second input port is connected to the audio chip. After receiving a debugging message output command, the CPU controls the output port to be electrically connected to the first input port to output the second kernel debugging message to the audio jack according to the debugging message output command.

According to another embodiment of the present invention, a method for outputting a kernel debugging message is provided. The method for outputting a kernel debugging message comprises following steps. A voltage level of the first kernel debugging message is converted to output a second kernel debugging message to the first input port of the multiplexer. Whether a debugging message output command is received is determined. After the debugging message output command is received, the output port of the multiplexer is electrically connected to the first input port to output the second kernel debugging message to the audio jack according to the debugging message output command.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
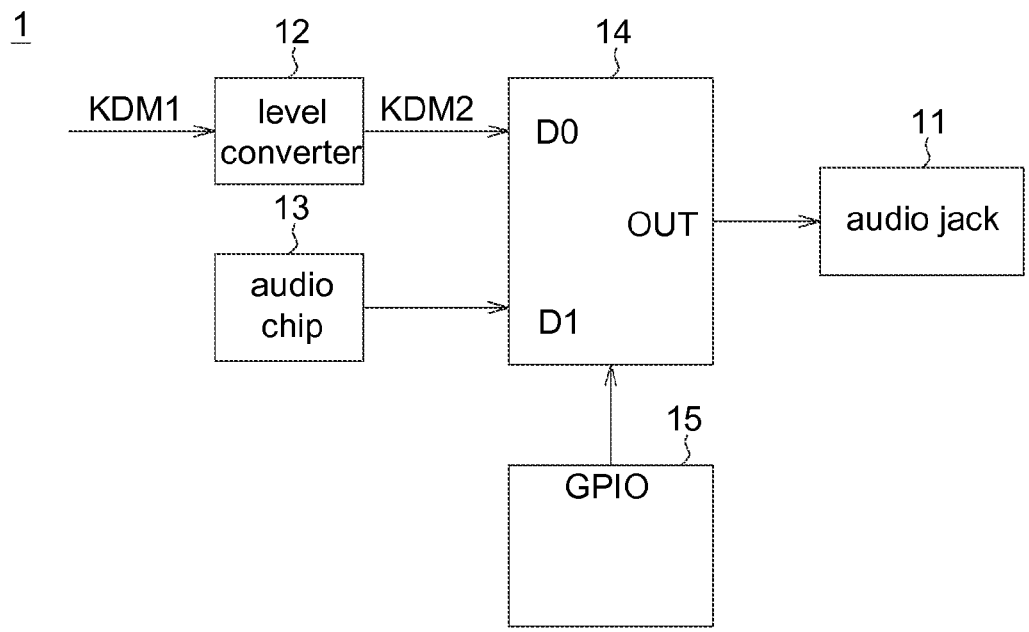
FIG. 1 is a schematic diagram of a mobile phone according to an embodiment of the disclosure.

Referring to FIG. 1, a schematic diagram of a mobile phone according to an embodiment of the disclosure is shown. The mobile phone 1 comprises an audio jack 11, a level converter 12, an audio chip 13, a multiplexer 14 and a central process unit (CPU) 15. The level converter 12 converts a voltage level of kernel debugging message KDM1 to output a kernel debugging message KDM2. The voltage level of the kernel debugging message KDM1 is between 0V~3.7V, and the voltage level of the kernel debugging message KDM2 is between −12V~12V. The kernel debugging message KDM1 can be obtained from the kernel space through a serial driver executed by the CPU 15.

The multiplexer 14 comprises an input port D0, an input port D1 and an output port OUT. The output port OUT is connected to the audio jack 11. The input port D1 is connected to the level converter 12. The input port D2 is connected to the audio chip 13. The CPU 15 selectively and electrically connects the input port D0 or the input port D1 to the output port OUT according to the user-inputted debugging message output command or the audio output command. After receiving a debugging message output command, the CPU 15 controls the output port OUT to be electrically connected to the input port D0 to output a kernel debugging message KMD2 to the audio jack 11 according to the debugging message output command. Conversely, after receiving an audio output command, the CPU 15 controls the output port OUT to be electrically connected to the input port D1 to electrically connect the audio chip 13 to the audio jack 11 according to the audio output command. The debugging message output command can be realized by a programming code such as: echo 0>switchGpio, and the audio output command can be realized by a programming code such as: echo 1>switchGpio.

The CPU 15 further comprises a general purpose I/O pin GPIO. Through the general purpose I/O pin GPIO, the CPU 15 controls the output port OUT to be electrically connected to the input port D0 to output a kernel debugging message KDM2 to the audio jack 11. Or, through the general purpose I/O pin GPIO, the CPU 15 controls the output port OUT to be electrically connected to the input port D1.

Figure 2:
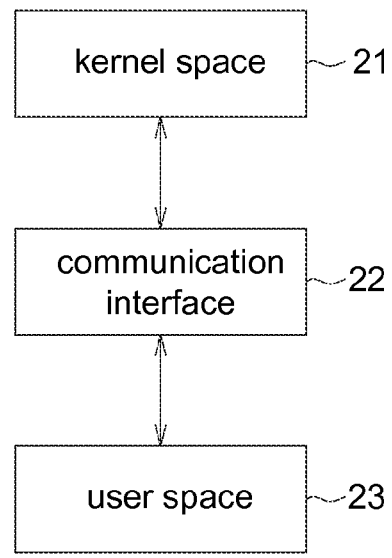
FIG. 2 is a schematic diagram of a kernel space, a communication interface and a user space according to an embodiment of the disclosure.

Refer to FIG. 1 and FIG. 2 at the same time. FIG. 2 is a schematic diagram of a kernel space, a communication interface and a user space according to an embodiment of the disclosure. It should be noted that the user-inputted debugging message output command controls the general purpose I/O pin GPIO to output a first logic level, and the audio output command controls the general purpose I/O pin GPIO to output a second logic level. When the general purpose I/O pin GPIO outputs the first logic level, the output port OUT of the multiplexer 14 is electrically connected to the input port D0. When the general purpose I/O pin GPIO outputs the second logic level, the output port OUT of the multiplexer 14 is electrically connected to the input port D1. The first logic level is such as logic level 1, and the second logic level is such as logic level 0. In the present embodiment, the second logic level is exemplarily larger than the first logic level. In other embodiments, the first logic level can be larger than the second logic level.

For the user-inputted debugging message output command and the audio output command to be associated with the general purpose I/O pin GPIO, the CPU 15 can output device or driver information to the user space 23 from the kernel space 21 or perform setting on the device and driver by using a Sysfs virtual file system. Thus, all operations done to the Sysfs virtual file system by the kernel space 21 will be reflected in the user space 23. Conversely, all operations done to the Sysfs virtual file system by the user space 23 will also be reflected in the kernel space 21.

Firstly, the CPU 15 registers an attribute array switch_attrs in the kernel space 21, wherein the attribute array switch_attrs comprises a call function switch_Gpio associated with the general purpose I/O pin GPIO. The attribute array switch_attrs can be realized by a programming code such as:

```
#define SWITCH_GPIO 10
static ssize_t switch_Gpio(struct device *dev, struct device_attribute *attr,
const char *buf, size_t count)
{
    struct mxt_data *data=dev_get_drvdata(dev);
    int rc=0;
    if (strncmp(buf, "0", 1) == 0) {
        gpio_set_value(SWITCH_GPIO, 0);
    } else{
        gpio_set_value(SWITCH_GPIO, 1);
    }
    return 0;
}
static struct attribute * switch_attrs[ ]={
    &dev_attr_ switchGpio.attr,
    NULL
};
static const struct attribute_group switch_attr_group={
    .attrs=switch_attrs,
};
```

Figure 3:
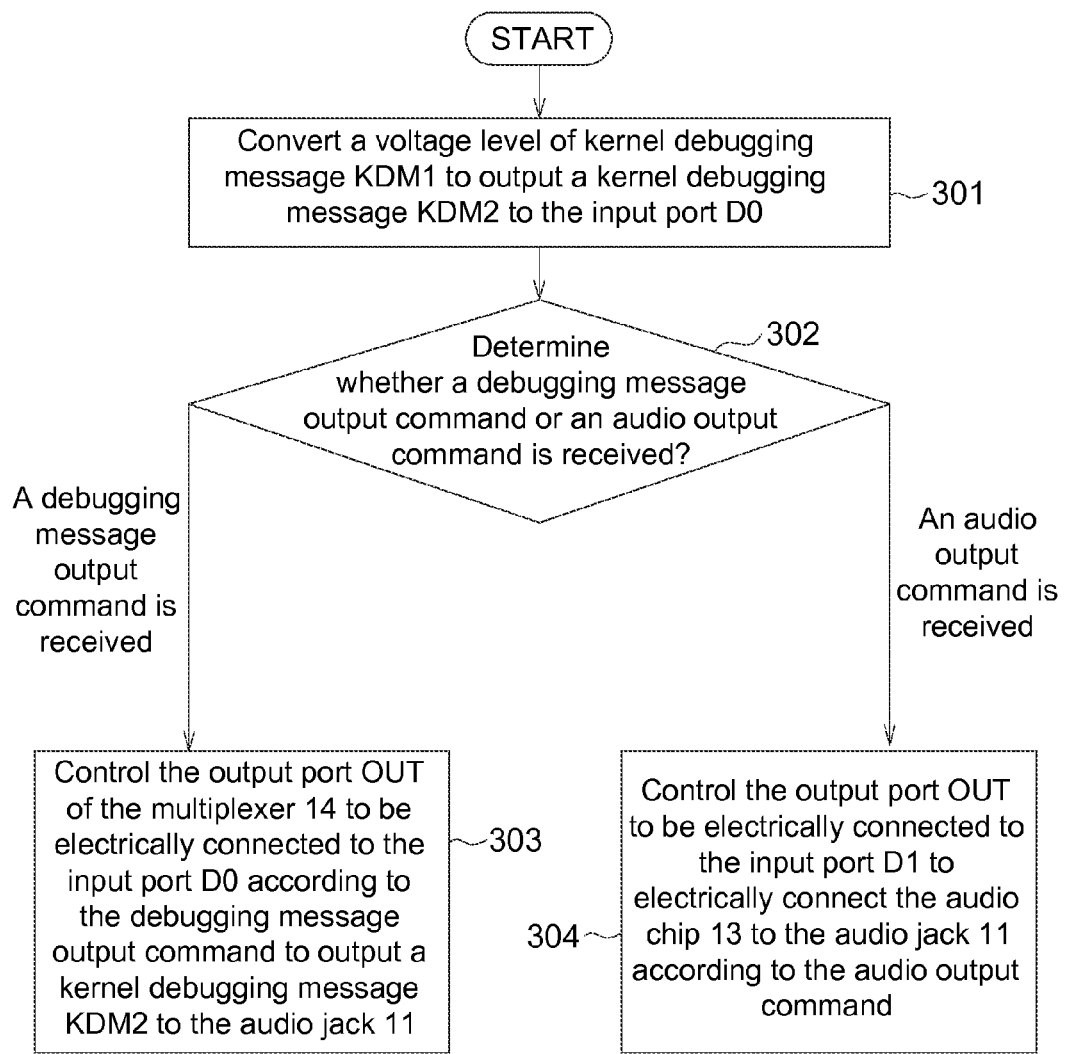
FIG. 3 is a method for outputting a kernel debugging message according to an embodiment of the disclosure.

Next, the CPU 15 registers a communication interface 22 associated with call function switch_Gpio, wherein the communication interface 22 communicates the call function switch_Gpio in the kernel space 21 with the debugging message output command or the audio output command in the user space 23. By using the communication interface 22, the CPU 15 can transmit the debugging message output command or the audio output command in the user space 23 to the kernel space 21. The registration with the communication interface 22 by the CPU 15 can be realized by a programming code such as:
static DEVICE_ATTR(switchGpio, S_IWUSR, NULL, switch_Gpio);

Refer to FIG. 1 and FIG. 3 at the same time. FIG. 3 is a method for outputting a kernel debugging message according to an embodiment of the disclosure. Firstly, the method begins at step 301, the level converter 12 converts a voltage level of kernel debugging message KDM1 to output a kernel debugging message KDM2 to the input port D0. Next, the method proceeds to step 302, the CPU 15 determines whether a debugging message output command or an audio output command is received. If it is determined that the CPU 15 received the debugging message output command, then the method proceeds to step 303. In step 303, the CPU 15 controls the output port OUT of the multiplexer 14 to be electrically connected to the input port D0 according to the debugging message output command to output a kernel debugging message KDM2 to the audio jack 11.

If it is determined that the CPU 15 received the audio output command, then the method proceeds to step 304. In step 304, the CPU 15 controls the output port OUT to be electrically connected to the input port D1 to electrically connect the audio chip 13 to the audio jack 11 according to the audio output command. Thus, the mobile phone can obtain a kernel debugging message from the kernel space by using the audio jack 11, and convenience in the research and development of the industries can be largely increased.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile phone, comprising:
   an audio jack;
   a level converter for converting a voltage level of a first kernel debugging message to output a second kernel debugging message;
   an audio chip;
   a multiplexer, comprising:
      an output port for connecting the audio jack;
      a first input port for connecting the level converter;
      a second input port for connecting the audio chip; and
   a central processing unit (CPU), wherein after receiving a debugging message output command, the CPU controls the output port to be electrically connected to the first input port to output the second kernel debugging message to the audio jack according to the debugging message output command.

2. The mobile phone according to claim 1, wherein after receiving an audio output command, the CPU controls the output port to be electrically connected to a second input port of the multiplexer according to the audio output command to electrically connect an audio chip to the audio jack.

3. The mobile phone according to claim 2, wherein the CPU comprises a general purpose I/O pin via which the CPU controls the output port to be electrically connected to the first input port to output the second kernel debugging message to the audio jack.

4. The mobile phone according to claim 3, wherein the CPU registers an attribute array in a kernel space, the attribute array comprises a call function associated with the general purpose I/O pin, the CPU registers a communication interface associated with the call function, the communication interface communicates the call function in the kernel space with the debugging message output command or the audio output command in a user space.

5. The mobile phone according to claim 4, wherein the debugging message output command controls the general purpose I/O pin to output a first logic level, and the audio output command controls the general purpose I/O pin to output a second logic level which is larger than the first logic level.

6. The mobile phone according to claim 4, wherein the debugging message output command controls the general purpose I/O pin to output a first logic level, and the audio output command controls the general purpose I/O pin to output a second logic level which is larger than the second logic level.

7. A method for outputting a kernel debugging message, comprising:
   converting a voltage level of a first kernel debugging message to output a second kernel debugging message to a first input port of a multiplexer;
   determining whether a debugging message output command is received; and
   controlling an output port of the multiplexer to be electrically connected to the first input port according to the debugging message output command to output a second kernel debugging message to an audio jack after the debugging message output command is received.

8. The method for outputting a kernel debugging message according to claim 7, further comprising:
   receiving an audio output command; and
   controlling the output port to be electrically connected to a second input port of the multiplexer according to the audio output command to electrically connect an audio chip to the audio jack after the audio output command is received.

9. The method for outputting a kernel debugging message according to claim 8, wherein in the control step, a general purpose I/O pin of a CPU controls the output port to be electrically connected to the first input port to output the second kernel debugging message to the audio jack.

10. The method for outputting a kernel debugging message according to claim 9, wherein the CPU registers an attribute array in a kernel space, the attribute array comprises a call function associated with the general purpose I/O pin, the CPU registers a communication interface associated with the call function, and the communication interface communicates the call function in the kernel space with the debugging message output command or the audio output command in a user space.

11. The method for outputting a kernel debugging message according to claim 10, wherein the debugging message output command controls the general purpose I/O pin to output a first logic level, and the audio output command controls the general purpose I/O pin to output a second logic level, which is larger than the first logic level.

12. The method for outputting a kernel debugging message according to claim 10, wherein the debugging message output command controls the general purpose I/O pin to output a first logic level, and the audio output command controls the general purpose I/O pin to output a second logic level, which is larger than the second logic level.

\* \* \* \* \*